Dec. 1, 1970  N. L. BROWN  3,543,585

VIBRATORY WIRE PRESSURE TRANSDUCER

Original Filed Jan. 29, 1965

INVENTOR
Neil L. Brown

By Smyth, Roston & Pavitt
Attorneys

United States Patent Office 3,543,585
Patented Dec. 1, 1970

3,543,585
VIBRATORY WIRE PRESSURE TRANSDUCER
Neil L. Brown, El Cajon, Calif., assignor to The Bissett-Berman Corporation, Santa Monica, Calif., a corporation of California
Continuation of application Ser. No. 429,075, Jan. 29, 1965. This application Aug. 17, 1967, Ser. No. 661,467
Int. Cl. G01l 9/00
U.S. Cl. 73—398                                              4 Claims

ABSTRACT OF THE DISCLOSURE

This application relates to a pressure transducer which includes a wire having a relatively great rigidity, the rigidity of the wire remaining substantially constant even with variations in temperature. The wire is coupled to a bellows which receives fluid at variable pressure and which imposes upon the wire a force dependent upon the pressure of the fluid. The bellows is expansible with variations in temperature without producing any effect on the force imposed upon the wire. The wire is vibratable at a natural frequency dependent upon the force imposed upon the wire. This natural frequency is measured to provide an indication of the force upon the wire. In this way, the wire provides an indication of the variable pressure of the fluid introduced to the bellows without being affected by variations in temperature.

---

This application is a streamlined continuation of application Ser. No. 429,075, filed Jan. 29, 1965, now abandoned.

The present invention relates to pressure gauges and more particularly to pressure gauges of the type wherein the frequency of a vibrating wire is a function of the pressure.

There are a wide variety of pressure transducers capable of sensing a fluid pressure and producing an electrical signal having one or more characteristics that are a function of the pressure. When it is desired to telemeter a pressure signal from one location to another, the possibility of error can be greatly reduced if the pressure signal has a frequency which is a function of the pressure. In most forms of pressure transducers, it is necessary to convert an amplitude modulated voltage or current signal into a signal having a frequency modulated output that is a function of the pressure.

One form of pressure transducer which is capable of directly producing a signal having a frequency that is a function of the pressure is a so-called vibrating wire pressure gauge known as a "Vibraton." In such a pressure gauge, a vibrating wire is disposed in a permanent magnetic field. One end of this wire is connected to a diaphragm carried by the support. One side of this diaphragm is exposed to the pressure to be measured and moves the end of the wire in response to the magnitude of the pressure. This movement changes the length of the wire and consequently the tension and, therefore, changes the frequency at which the wire vibrates.

The accuracy of pressure transducers of the foregoing variety is dependent upon the natural or free length of the vibrating wire remaining extremely constant relative to the length of the support structure. If this length varies by even a very small amount, there is a major change in the frequency of the vibrations. The pressure-sensitive diaphragm has a substantial amount of rigidity in order to prevent the pressure from overstressing the diaphragm. As a result, the rigidity of the diaphragm has been large compared to the rigidity of the wire. As a consequence, if the physical dimensions of the various portions of the transducer vary over even a small range, for example as a result of creepage or temperature changes, the tension in the wire will vary significantly and produce large errors.

It may thus be seen that heretofore when employing a prior art vibrating wire transducer, it has been necessary to maintain the temperature of the transducer constant or compensate for variations in the temperature by precise matching. As a result, vibrating wire transducers available heretofore have not been entirely satisfactory for measuring pressures and particularly in those instances where the pressure must be measured with a high degree of accuracy over a wide range of operating conditions.

The present invention provides means for overcoming the foregoing disadvantages and limitations of the prior pressure transducers. More particularly, the present invention provides a pressure transducer which provides a signal having a frequency which is a function of the pressure to be measured and which is virtually independent of the temperature of the transducer or of its surrounding environment. This is accomplished by providing a pressure transducer wherein a vibrating wire is operatively interconnected with a pressure-sensitive device such as a diaphragm, bellows, etc. The pressure-sensitive device and wire are constructed and arranged such that the tension in the wire is a function of the to-be-measured pressure and is independent of the surrounding temperature or of creepage of the various parts of the transducers. The resonant frequency of the wire is thereby a function of the to-be-measured pressure and is virtually independent of any error producing factors such as changes in the length of the wire produced by such extraneous factors as variations in temperature, etc. This is to be accomplished by among other things making the rigidity of the pressure sensitive means very small compared to the rigidity of the wire.

These and other features and advantages of the present invention will become readily apparent from the following detailed description of one operative embodiment thereof, particularly when taken in connection with the accompanying drawings wherein like reference numerals refer to like parts and wherein.

Figure 2:
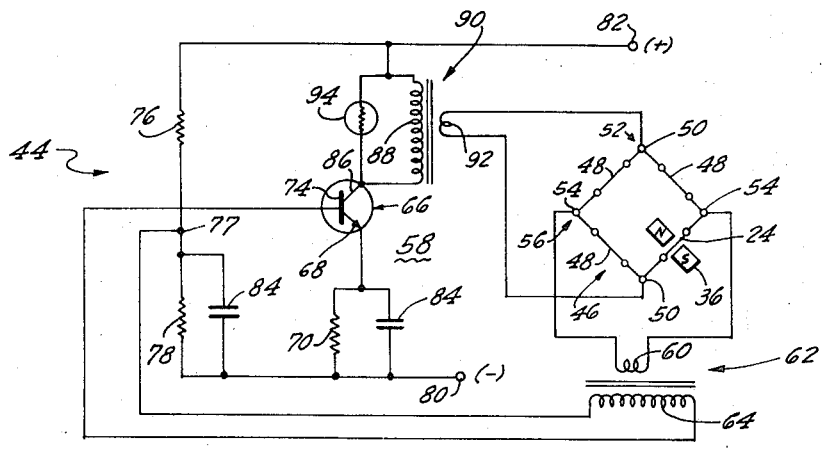
FIG. 2 is a schematic diagram of an electronic circuit that may be employed with the foregoing pressure transducer.
Figure 1:
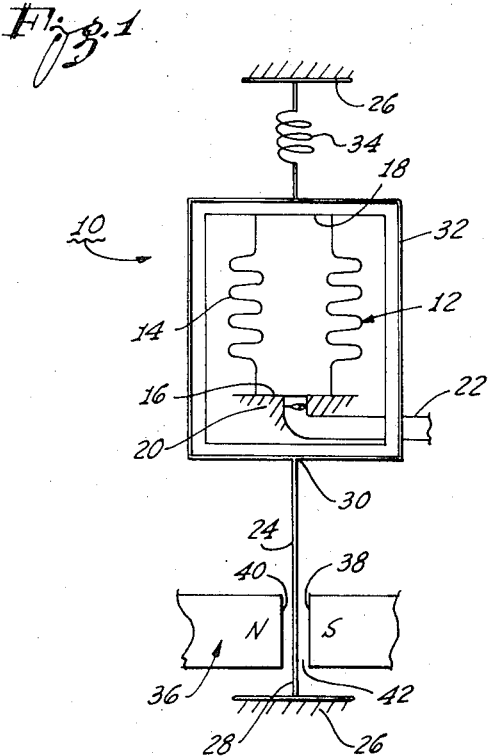
FIG. 1 is a cross-sectional view of a pressure transducer embodying one form of the present invention.

Referring to the drawings in more detail and particularly to FIG. 1 thereof, the present invention is adapted to be embodied in a pressure transducer 10 capable of measuring the difference between the pressure of a first fluid such as the surrounding atmosphere and the pressure of a second fluid.

The pressure transducer 10 includes a pressure sensitive device that is capable of having its opposite sides exposed to the two pressures to be compared whereby a force will be present between the opposite sides that is proportioned to the pressure differential. Although the pressure sensitive device may be of any suitable variety such as a diaphragm, in the present instance a bellows 12 is employed.

This bellows 12 includes flexible sidewalls 14 and sealed ends 16 and 18. The sidewalls 14 are corrugated so that they can be easily deformed as the opposite ends 16 and 18 move axially toward and away from each other. As a consequence, the external pressure acting on the outside of the ends 16 and 18 of the bellows 12 will tend to compress the bellows 12 axially inwardly with a force proportional to the area of the ends 16 and 18 and to the magnitude of the external pressure. The pressure acting inside of the bellows 12 and against the ends 16 and 18 will produce a force which tends to expand the bellows 12 axially in proportion to the magnitude of the pressure and the areas of the ends 16 and 18.

It will thus be seen that a pressure differential will be present between the opposite ends 16 and 18 of the bellows 12. This pressure differential will produce a force that will tend to expand or contract the bellows 12 in proportion to the difference between the internal pressure and the external pressure.

For reasons which will become apparent subsequently, the pressure-sensitive device such as the bellows 12 should have very little, if any, rigidity in the axial direction. This will permit the ends 16 and 18 of the bellows 12 to be moved over a wide range of positions without materially altering the amount of force acting on the ends 16 and 18. Thus, the amount of tension in the wire will be a very accurate function of the pressure differential and virtually independent of any extraneous factors such as the ambient temperature, the magnitude of the pressure or of the amount of axial deflection of the bellows 12.

One end 16 of the bellows 12 is connected to a rigid support 20. As a consequence, this end 16 of the bellows 12 may be considered as being maintained in a fixed position. A conduit such as a tube 22 may be provided that extends through the support 20 whereby one end of its ends opens into the interior of the bellows 12. The opposite end of the tube 22 is adapted to be interconnected with a source of the to-be-measured pressure. This will permit the outside surfaces of the ends 16 and 18 of the bellows 12 to be subjected to a pressure equal to atmospheric while the inside surfaces of the ends 16 and 18 of the bellows 12 will be exposed to the to-be-measured pressure.

As previously stated, the axial rigidity of the bellows 12 is very low. As a result, the amount of force produced between the opposite ends 16 and 18 of the bellows 12 will be proportioned to the magnitude of this pressure differential, irrespective of the position of the end 18. Thus, even if the bellows 12 expands and contracts over a wide range, the force between the ends 16 and 18 will remain substantially constant.

In order to measure the amount of force acting between the ends 16 and 18 of the bellows 12 and, therefore, the pressure differential, a vibrating wire 24 is connected to the bellows 12 so that tension in the wire 24 is a function of the pressure differential or force. As a result, the resonant frequency of the wire 24 is a function of the force. The present invention is such that the tension in the wire increases with increasing pressure whereas in the prior art the reverse was true. As a result, the frequency of vibration will increase as the pressure increases.

In the present instance, this is accomplished by providing a rigid support 26 that is a part of the support 20 or remains in a fixed relation to the support 20. One end 28 of the wire 24 is connected to support 26 so as to be restrained against movement relative to the support 20.

The second end 30 of the wire 24 is connected to the second end 18 of the bellows 12 by means of a rigid member such as a stirrup 32 that is connected to the bellows 12 and to the vibrating wire 24. It will be seen that as the pressure inside of the bellows 12 increase the stirrup 32 will transfer an increasing tension into the wire 24. Since the bellows 12 has very little, if any, axial stiffness, all of the tension in the wire 24 will be a function of the pressure differential between the inside and outside of the bellows 12.

It has been found desirable to provide a tensioning device such as a spring 34 between the stirrup 32 and the support 26. This will be effective to add a predetermined and constant tension to the wire 24. Thus, even though there is no pressure differential between the inside and outside of the bellows 12, there will be a predetermined minimum tension in the wire 24. This, in turn, will insure the wire 24 always having a predetermined resonant frequency that equals or exceeds a threshold level.

The frequency at which the wire 24 vibrates may be determined by any suitable means. However, in the present instance, it is accomplished by means of a magnetic field that surrounds the wire 24. The magnetic field may be created by any suitable means. In the present instance, this is accomplished by means of a permanent magnet 36 having a pair of parallel pole faces 38 and 40. The pole faces 38 and 40 are positioned on the opposite sides of the wire 24 whereby the wire 24 will be disposed in the air gap 42. This will insure the wire 24 being completely surrounded by the flux field.

If a brief or short pulse of electric current flows through the vibrating wire 24, it will produce a dynamic flux field around the wire 24. This momentary field 24 will react with the steady flux field from the permanent magnet 36. The reaction between the two fields will cause the wire 24 to be momentarily displaced and released. As soon as the wire 24 is released, it will vibrate at its natual resonant frequency. This frequency will be determined by a large number of factors including the length of the wire, the area of the wire, the mass of the wire and the tension in the wire.

Although the pulse of current may be applied to the wire 24 by any suitable means, it has been found desirable to provide a series of current pulses having a frequency equal to the frequency at which the wire 24 vibrates. In the present instance, this is accomplished by means of an oscillator 44 controlled by the vibrating wire 24. The present oscillator 44 includes a bridge circuit 46 having one leg formed by the active or vibrating wire 24. The remaining three sides of the bridge 46 are balanced by "dummy wires" 48 having electrical characteristics which are effective to balance the reactance of the active wire 24 when the active wire 24 is static.

The first pair of opposite corners 50 forms an input 52 while the second pair of corners 54 forms an output 56. The input and output corners are coupled to a feedback circuit 58 which will produce a regenerative amplification. As a consequence, the circuits will function as an oscillator.

More particularly, the output corners 54 of the bridge 46 are connected to the primary 60 of an impedance matching transformer 62. The secondary 64 of this transformer 62 is coupled to a suitable amplifying device such as a transistor 66. The emitter 68 of the transistor 66 is connected to ground or a negative supply 80 by means of a resistor 70. One side of the secondary 64 is connected directly to the base 74 while the other side is connected to a junction 77 in a voltage dividing resistive network having resistors 76 and 78 extending between the negative supply 80 and the positive supply 82. Suitable AC bypass condensers 84 may be provided across the two resistors 70 and 78.

The collector 86 of the transistor 66 is connected directly to the primary 88 of the transformer 90. The opposite side of the primary 88 is connected to the positive side 82 of the power supply. The secondary 92 of the transformer 90 is connected to the input corners 50 of the bridge 46.

When the wire 24 vibrates, it will unbalance the bridge 46 at a frequency that is the same as the frequency at which the wire 24 vibrates. The resulting signal will flow to the primary 60 and be coupled into the secondary 64. The signal will then be applied between the base 74 and emitter 68 of the transistor 66. As the current flow between the base 74 and emitter 68 varies, the current flowing in the collector 86 will vary in an identical manner, but amplified in magnitude. This current flows through the primary 88 and is coupled into the secondary 92. A corresponding current then flows through the bridge 46 and in particular through the active wire 24.

As the current flows through the wire 24, it will create a dynamic flux field. This field will react with the permanent flux field from the magnet 36 and cause the wire 24 to vibrate. At frequencies that are not equal to the frequency at which the wire 24 vibrates, the output from the bridge 46 is too small to sustain oscillations. When the frequency is close to the frequency of the vibrators, the phase shift around the loop and in the wire 24 will be so large as to prevent any oscillations. As a consequence, the loop will oscillate only at a frequency equal to the natural resonant frequency of the wire 24.

In order to control the amplitude of the oscillations, a suitable automatic gain control circuit may be employed to limit the oscillations. However, in the present instance, a thermistor 94 is placed in series with the collector 86 and in parallel to the primary 88. When the signals become excessive, the thermistor 94 will overheat. The resistance of the thermistor 94 will then decrease whereby the gain will be limited to a level providing signals having the desired amplitude.

In order to employ the present transducer 10 for measuring pressure, the tube 22 may be connected with a source of the to-be-measured pressure and the oscillator 44 energized. This will cause wire 24 to begin vibrating at its natural resonant frequency and the oscillator 44 to run at the same frequency. The resonant frequency will be determined by a wide variety of factors including the length of the wire 24 and the tension therein.

As the pressure inside of the bellows 12 increases, the tension in the wire 24 will increase whereby the natural resonant frequency will increase. As previously stated, the axial rigidity of the bellows 12 is very small compared to that of the wire. As a result, if there are any variations in the various portions of the system, the distance between the ends 16 and 18 of the bellows 12 will be correspondingly altered so that the tension in the wire 24 will not be materially altered from that produced by the difference between the pressure in the tube 22 and the pressure external to the bellows. This is also true even though the free length of the wire 24 may vary. As a consequence, the natural resonant frequency will be extremely closely related to the pressure.

By way of example, the following calculations of one operative embodiment illustrate the magnitude of the frequency change resulting from a change in the unstretched length of the wire resulting from such causes as elastic creep, temperature changes, etc.

Let:
$l_w$=length of wire 24=5 cms.
$d$=diameter of wire 24=0.050 cm.
$A$=effective area of bellows 12=2 cm.$^2$
$P$=actual pressure in the fluid=$.25 \times 10^6$ dynes/cm.$^2$
$R_B$=axial rigidity of the bellows 12=$.5 \times 10^6$ dynes/cm. (approximately 3 lbs./in.)
$E$=elastic modulus (steel)=$2 \times 10^{12}$ dynes/cm./cm.
$R_w$=longitudinal rigidity of the wire 24

$$= \frac{\text{Tension}}{\text{elongation}}$$

$$= P.A. \cdot \frac{E}{S.l_w}$$

$$= \frac{P.A.E.d^2\pi}{P.A.l_w 4.}$$

$$= \frac{\pi E.d^2}{4.l_w}$$

$$= \frac{\pi \times 2 \times 10^{12} \times (.05)^2}{4 \times 5} = .78575 \times 10^8$$

$R_T$=total rigidity of the system
$= R_B + R_W$
$= .5 \times 10^6 + .78575 \times 10^8$
$= .79075 \times 10^8$ dynes/cm.

If one assumes that $P=0$, there is no stress in either the wire 24 or the bellows 12 then at $P = .5 \times 10^6$ dynes/cm.$^2$ the deflection of the wire $dl_w$ is given by:

$$dl_w = \frac{\text{Total force}}{\text{Total rigidity}} = \frac{P \times A}{R_T}$$

$$= \frac{.25 \times 10^6 \times 2}{.79075 \times 10^8}$$

$$= .63231 \times 10^{-2} \text{ cms.}$$

$$\text{stress} = \frac{dl_w}{l_w} \cdot E.$$

$$= \frac{.63231 \times 10^{-2}}{5.000} \cdot 2 \times 10^{12}$$

$$= .25292 \times 10^{10} \text{ dynes/cm.}^2$$

$$\frac{\text{Frequency}}{\text{of vibration}} = \frac{1}{2l} \sqrt{\frac{S}{\sigma}}$$

where S=stress in the wire
$\sigma$=density (gm./cm.$^3$) of the wire $$= \frac{1}{2 \times 5} \sqrt{\frac{.25292 \times 10^{10}}{8}}$$

$$= \frac{10^4}{10} \sqrt{3.1615}$$

$$= 10^3 \times 1.7781$$

$$= 1778.1 \text{ c./s.}$$

If now the unstretched length of the wire 24 changes from 5.00000 centimeters to 5.00050 centimeters due to temperature, then the following tension and frequency will result:

At $P=0$, the stretch in the wire 24, i.e. the difference between 5.00000 and 5.00050 will result in an initial stress in the wire 24 and bellows 12 such that the initial tension in the wire at $P=0$ is equal to the tension in the bellows 12 due to the fact that it is slightly displaced from its rest position.

Now the initial tension in the wire ($T_i$) can be calculated as follows:

The initial stretch in the wire 24 $dl'_w$ results in a tension ($T_i$) in both the wire 24 and the bellows 12 such that:

$$dl'_w = \frac{T_i}{R_B} + \frac{T_i}{R_W}$$

$$= \frac{T_i(R_W + R_B)}{R_B R_W}$$

$$T_i = \frac{dl'_w \cdot R_B R_W}{R_W + R_B}$$

$$= \frac{(5.00000 - 5.00050)(.5 \times .78575 \times 10^{14})}{(.5 \times 10^6 + .78575 \times 10^8}$$

$$= \frac{-5 \times 10^{-4} \times .3929 \times 10^{14}}{.79075 \times 10^8}$$

$$= \frac{-10^2 \times 5 \times .3929}{.79075}$$

$$= -2.4844 \times 10^2 \text{ dynes}$$

When the pressure is increased from 0 to $0.25 \times 10^6$ dynes/cm.$^2$, the total force (tension) now given by $$T_t = T_i + P.A.$$

$$= -2.4844 \times 10^2 + 0.25 \times 10^6 \times 2^A$$

$$= .499752 \times 10^6 \text{ dynes}$$

$$\frac{\text{elongation of}}{\text{wire 24 } (dl_w)} = \frac{\text{Total force}}{\text{Total rigidity}}$$

$$= \frac{.499752 \times 10^6}{.79075 \times 10^8}$$

$$= .63200 \times 10^{-2} \text{ cms.}$$

stress $(S) = \frac{dl_w}{l} \cdot E$ $= \frac{.63200 \times 10^{-2} \times 2 \times 10^{12}}{5.00050}$ $= .252775 \times 10^{10}$ dynes/cm.$^2$ Frequency of vibration $= \frac{1}{2.1} \sqrt{\frac{.252775 \times 10^{10}}{8}}$ $= \frac{1}{2 \times 5.00050} \sqrt{3.1597 \times 10^8}$ $= \frac{17775.5}{10.001}$ $= 1777.4$ c./s. (cycles per seconds)

In the first example, the frequency is 1778.1. As a result, the change in frequency resulting from changes in temperature on the length of the wire is only 0.7 c./s. (cycles per second) shift. It can be appreciated that this is an insignificant change, especially when changes in the order of 83 cycles per second have been produced in the frequencies of the wire under similar changes in temperature in the transducers of the prior art. For example, changes of 83 cycles in frequency may be seen from the following calculations with respect to the devices of the prior art:

$$\text{Frequency } f = \frac{l}{2l}\sqrt{\frac{T}{\sigma}}$$

where:
$l$ = length of the wire (cms.)
$T$ = tension in the wire (dynes)
$\delta$ = mass per unit length of the wire (gms./cm.)
The tension $T = AS$
where:
$A$ = cross-sectional area of the wire
$S$ = stress in the wire material
The mass/unit length $\delta = A\sigma$
where:
$\sigma$ = densiy (gms./cm.$^3$)

$$\text{Frequency } f = \frac{l}{2l}\sqrt{\frac{AS}{A\sigma}}$$

$$= \frac{l}{2l}\sqrt{\frac{S}{\sigma}}$$

Now the stress $S$ = strain × elastic modulus $= \frac{dl_w}{l} \cdot F$ where $dl_w$ = change in length of the wire from its unstressed length 1.

It should be noted that $dl_w$ is the change in length or displacement from the original unstressed length. If factors such as aging, elastic creep or temperature changes cause the unstressed length to change from its original value 1, then the effective value of $dl_w$ will be changed, thus leading to a change in the stress S as given in the above equation for the stress S.

For example:
Let the original unstressed length (1) = 5.00000 cms.
Let the initial stretch or displacement $dl_w$ = 0.00500 cms.
Let the elastic modules (E) (typical for steel) = $2 \times 10^{12}$ dynes/cm./cm.
Let the density $\sigma = 8$ (steel)

Then the stress $S = \frac{dl_w \cdot E}{l}$ $= \frac{.005 \times 2 \times 10^{12}}{5.005}$ $= 1.998 \times 10^9$ dynes/cm.$^2$ Frequency $f = \frac{l}{2l}\sqrt{\frac{S}{\sigma}}$ $= \frac{l}{10.01}\sqrt{\frac{1.998 \times 10^9}{8}}$ $= \frac{l}{10.01}\sqrt{2.498 \times 10^8}$ $= 999\sqrt{2.498}$ $= .1581$ cycle/sec.

i.e., if the wire is stretched from 5.00000 to 5.00500 cms., the frequency of vibration is 1580 c./s. If the "unstretched" length changes from 5.00000 to 5.00050 due to say temperature, then stretching the wire to same stretched length as previously, i.e., 5.00500 will result in the following tension and frequency:

The stress $S = \frac{dl_w}{l} \cdot E$ $= \frac{5.00500 - 5.00050}{5.00050} \cdot E$ $= \frac{.0045}{5.00050} \cdot 2 \times 10^{12}$ $= 1.79982 \times 10^9$ dynes/cm.$^2$ Frequency $= \frac{l}{2 \times 5.005}\sqrt{\frac{1.79982 \times 10^9}{8}}$ $= \frac{l}{10.01}\sqrt{2.24977 \times 10^8}$ $= 999 \times 1.4999$ $= 1498$ c./s.

In other words, changing the unstretched length from 5.00000 to 5.00050 cms. in the devices of the prior art caused the frequency to decrease from 1581 to 1498 c./s. when the wire was stretched to 5.00500 cms. in either case.

In view of the rigid nature of the diaphragms in the pressure transducers of the prior art, such transducers may be considered as providing a "constant displacement." However, since the bellows in the pressure transducer constituting this invention is responsive to changes in temperature, the pressure transducer constituting this invention may be considered as providing a "constant tension." Because of this, the pressure transducer constituting this invention does not have to be operated in a temperature regulated environment as do the pressure transducers of the prior art.

Figure 3:
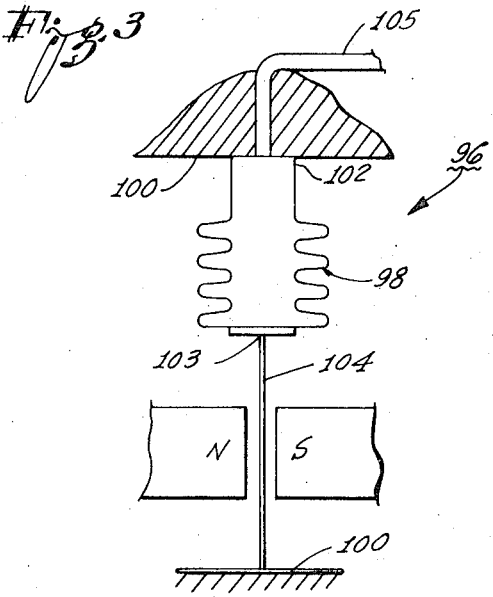
FIG. 3 is a cross-sectional view of a pressure transducer embodying another form of the present invention.

As an alternative, the embodiment of FIG. 3 may be employed. This embodiment is particularly adapted to measure pressures that are less than the pressures of the surrounding atmosphere. This embodiment 96 employs a pressure-sensitive device such as a bellows 98 similar to bellows 12.

One end 102 of the bellows 98 is connected directly to a rigid support 100. The opposite end 103 of the bollows 98 is connected to one end of a wire 104. The opposite end of the wire 194 is connected to the rigid support 100.

The interior of the bellows 98 is connected to a source of the pressure to be measured by a tube 105. Normally, this pressure will be less than the surrounding atmosphere. As a result, the forces on the bellows 98 will tend to contract it and produce a tension in the wire 104.

While only a limited number of embodiments have been disclosed herein, it will be readily apparent to persons skilled in the art that numerous changes and modifications may be made without departing from the spirit of the invention. Accordingly, the foregoing disclosure is for illustrative purposes only and does not limit the invention which is defined only by the claims that follow.

I claim:
1. A pressure transducer for measuring the magnitude of a pressure independently of any variations in temperature, including:
   a substantially rigid vibratable member disposed in a particular direction and having a resonant frequency dependent upon the force imposed upon the member,
   pressure responsive means interconnected with said member and responsive to said pressure to impose upon said vibratable member a force dependent upon said pressure, the pressure responsive means having considerably less rigidity in the particular direction than said vibratable member, said pressure responsive means being effective to maintain on said member a force dependent substantially only upon the pressure even with variations in temperature to cause the rigid vibratable member to be responsive substantially only to the force imposed upon the member by the pressure,
   means interconnected with said vibratable member to vibrate said member at the resonant frequency of said vibratable member, and
   means connected to the vibratable member for providing and indication of the resonant frequency of the vibratable member to provide an indication of the pressure.
2. A pressure transducer for measuring the magnitude of a pressure independently of any variations in temperature, including:
   a vibratable member elongated in a particular direction and having a resonant frequency dependent upon the force imposed upon the member in the particular direction, said member having a relatively great rigidity in the particular direction,
   first means responsive to said pressure and interconnected with said vibratable member to impose upon said member a force dependent upon the pressure, said first means having a rigidity in the particular direction less than the rigidity of the vibratable member in the particular direction,
   the expansion of the first means in the particular direction with changes in temperature producing substantially no effect on the vibratable member,
   means interconnected with said vibratable member to vibrate said member at said resonant frequency, and
   means interconnected with said vibratable member for indicating the resonant frequency to provide a determination of the pressure.
3. A pressure transducer for measuring the magnitude of a pressure independently of any variations in temperature, including:
   an axial member elongated in the axial direction and having a natural resonant frequency dependent upon the force imposed upon the member, said member having a particular rigidity in the axial direction,
   first means responsive to said pressure and interconnected with said member to vary the force imposed on said member in accordance with variations in the pressure, said first means having a relatively small rigidity in the axial direction compared to the rigidity of the axial member in the axial directon,
   the expanson of the first means in the axial direction with changes in temperature producing substantially no effect on the axial member,
   drive means coupled to said axial member to resonate said member at the natural resonant frequency of said member, and
   means responsive to the resonations of said member to provide an indication of the natural resonant frequency of said member for indicating the force imposed upon said member.
4. A pressure transducer for measuring the magnitude of pressure independently of any variations in temperature, including:
   a vibratable wire having a relatively great axial rigidity and vibratable at a resonant frequency dependent upon the force imposed upon the wire in the axial direction,
   a bellows having first and second ends displaced from each other in the axial direction and having the first end connected to one end of said wire to impose upon said wire a force dependent upon said pressure,
   said bellows having in the axial direction a rigidity that is substantially independent of its length and is relatvely small compared to the rigidity of said wire in the same direction,
   the second end of the bellows and the other end of the wire being fixed,
   the expansion of the bellows in the axial direction with changes in temperature producing substantially no effect on the wire,
   means responsive to the vibrations of said wire for indicating the resonant frequency of the wire to provide an indication of the pressure in the bellows, and
   drive means operatively coupled to said wire to vibrate said wire at its resonant frequency.

References Cited

UNITED STATES PATENTS

| | | | |
|---|---|---|---|
| 2,150,771 | 3/1939 | Kollsman | 73—393 |
| 2,600,271 | 6/1952 | Schaevitz | 73—393UX |
| 3,046,789 | 7/1962 | Boss | 73—398 |

DONALD O. WOODIEL, Primary Examiner

U.S. Cl. X.R.

73—410